United States Patent
Barreirinhas et al.

(10) Patent No.: US 8,976,169 B1
(45) Date of Patent: Mar. 10, 2015

(54) RENDERING TERRAIN PATCHES

(75) Inventors: Quarup Barreirinhas, San Francisco, CA (US); Emil Praun, Union City, CA (US); Lu Liu, Mountain View, CA (US)

(73) Assignee: Google Inc., Mountain View, CA (US)

(*) Notice: Subject to any disclaimer, the term of this patent is extended or adjusted under 35 U.S.C. 154(b) by 374 days.

(21) Appl. No.: 13/461,537

(22) Filed: May 1, 2012

(51) Int. Cl.
*G06T 15/00* (2011.01)

(52) U.S. Cl.
USPC .......................................................... 345/419

(58) Field of Classification Search
CPC ..... G06T 15/00; G06T 15/005; G06T 19/006; G06T 19/00; G06T 15/04; G06T 13/20
See application file for complete search history.

(56) References Cited

U.S. PATENT DOCUMENTS

| 2005/0253843 A1* | 11/2005 | Losasso Petterson et al. ......................... 345/428 |
| 2006/0072821 A1* | 4/2006 | Wang ............................ 382/173 |
| 2007/0171234 A1* | 7/2007 | Crawfis et al. ............... 345/587 |

* cited by examiner

*Primary Examiner* — Kee M Tung
*Assistant Examiner* — Frank Chen
(74) *Attorney, Agent, or Firm* — Dority & Manning, P.A.

(57) ABSTRACT

Systems, methods, and computer storage mediums are provided for blending custom terrain patches onto a terrain of a virtual three-dimensional environment. A method includes accessing terrain data that describes a mesh representing the surface of the terrain of the three-dimensional environment. The mesh is constructed of primitives that are defined by a terrain altitude at each vertex. A surface grid is determined from the primitives such that each point in the surface grid includes the terrain altitude where the point falls on the mesh. Custom terrain data is also accessed that includes a custom grid of terrain altitudes. A patch grid is determined from the custom grid such that each point in the patch grid includes a terrain altitude derived from the custom grid. The patch and surface grids are blended such that each terrain altitude in the patch grid modifies its corresponding terrain altitude in the surface grid.

21 Claims, 9 Drawing Sheets

RENDERING TERRAIN PATCHES

FIELD

The embodiments described herein generally relate to generating and rendering three-dimensional environments.

BACKGROUND

Geographic information systems allow users to download, view, and interact with geo-referenced data. The geo-referenced data may be provided to a user through a three-dimensional environment displayed on the user's computer system. The user may interact with the geo-referenced data by selecting geographic features, navigating through the three-dimensional environment, or selecting layers or sets of data for display. The geo-referenced data may be stored at a shared geographic database that is accessed by one or more geographic information servers. Layers or sets of data that may be displayed with the three-dimensional environment may be created by the user or provided by a third party. The layers or sets of data, however, may not allow the user to modify the terrain of the environment.

BRIEF SUMMARY

The embodiments described herein include systems, methods, and computer storage mediums for blending custom terrain patches onto a surface of a terrain of a three-dimensional environment. A method includes accessing terrain data that describes a mesh representing the surface of the terrain of the three-dimensional environment. The mesh is constructed of primitives and each primitive is defined by a terrain altitude at each of the primitive's vertices. A surface grid is determined from the primitives that overlap an area defined by a custom terrain grid. The surface grid is determined such that each point in the surface grid includes the terrain altitude according to where the point in the surface grid falls on the mesh. Custom terrain data is also accessed. The custom terrain data includes a plurality of terrain altitudes arranged in a custom terrain grid. The boundary of the custom terrain grid defines an area of the surface. A patch grid is determined from the custom terrain grid such that each point in the patch grid includes a terrain altitude derived from the custom terrain grid. A resolution and an area of the patch grid corresponds to a resolution and an area of the surface grid such that each point in the patch grid aligns with a point in the surface grid. The patch grid and the surface grid are blended such that each terrain altitude in the patch grid modifies its aligned terrain altitude in the surface grid.

Further features and advantages of the embodiments described herein, as well as the structure and operation of various embodiments, are described in detail below with reference to the accompanying drawings.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Figure 1A:
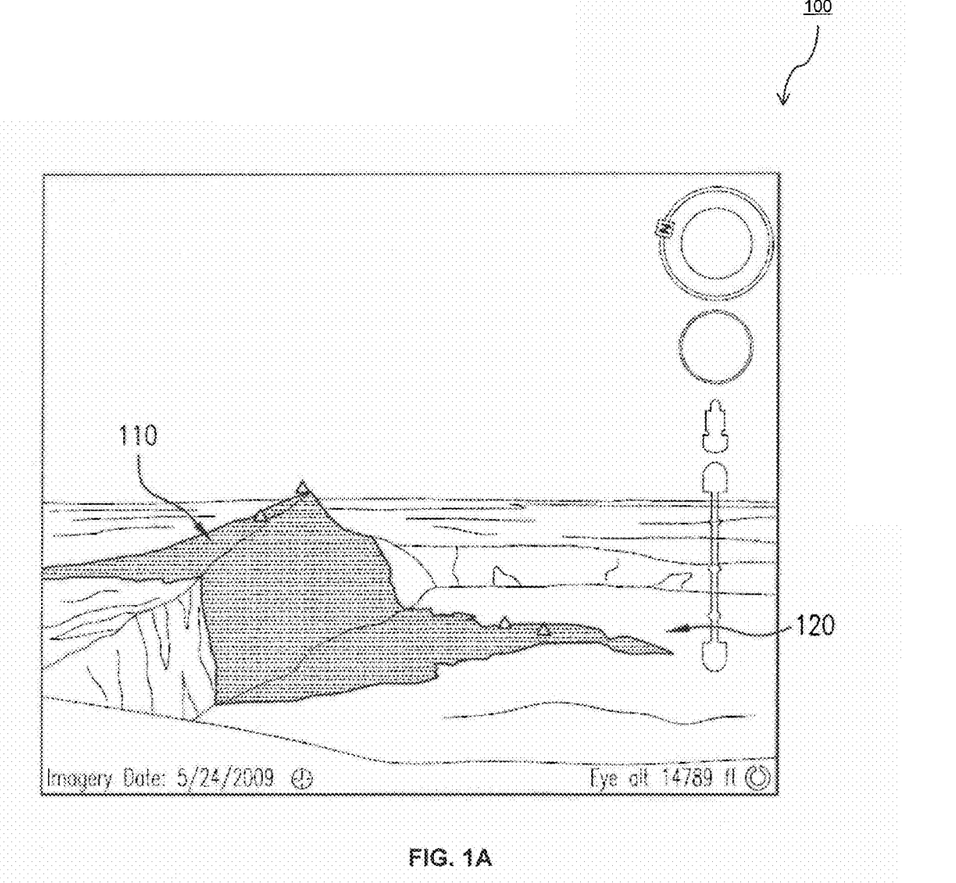
FIG. 1A illustrates an example three-dimensional environment rendered with a terrain patch according to an embodiment.
Figure 1B:
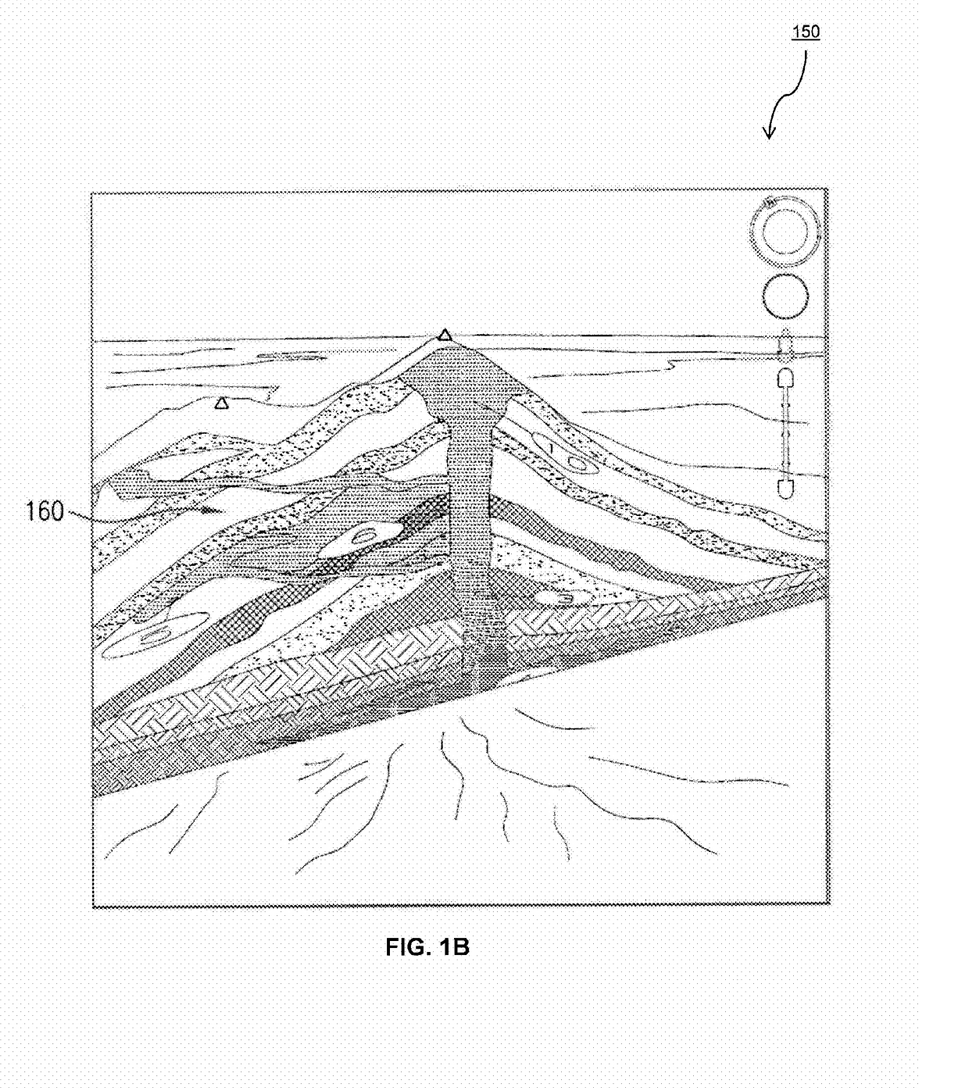
FIG. 1B illustrates an example three-dimensional environment rendered with an alternative terrain patch according to an embodiment.

Embodiments described herein may be used to blend custom terrain patches onto a surface of a terrain of a three-dimensional environment. Terrain patches may be inserted or otherwise included in a three-dimensional environment in order to modify the terrain of the three-dimensional environment in some way. For example, a user of the three-dimensional environment may want to use a terrain patch as an educational tool to show various features or layers of the terrain. To accomplish this, the user may design a terrain patch that represents an individual peak of a mountain range rendered in the three-dimensional environment such that half of the peak is flat. Such an example is represented in FIG. 1A. The user may also design a terrain patch that renders the peak with various colors that represent layers of geological features. Such an example is represented in FIG. 1B. Other uses for terrain patches may include, for example, modifying the height of the terrain of the three-dimensional environment to show geological shift or erosion over time. These uses are merely provided as examples and are not intended to limit the embodiments described herein.

The following detailed description, references to "one embodiment," "an embodiment," "an example embodiment," etc., indicate that the embodiment described may include a particular feature, structure, or characteristic. Every embodiment, however, may not necessarily include the particular feature, structure, or characteristic. Thus, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The following detailed description refers to the accompanying drawings that illustrate example embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the detailed description is not meant to limit the embodiments described below.

This Detailed Description is divided into sections. The first section describes examples of a three-dimensional environment with a terrain patch as well as various stages of deriving a terrain patch. The second and third sections describe example system and method embodiments, respectively, that may be used to blend custom terrain patches onto a surface of a terrain of a virtual three-dimensional environment. The fourth section describes an example computer system that may be used to implement the embodiments described herein.

Example Terrain Patches

FIG. 1A illustrates an example three-dimensional (3D) environment 100 rendered with a terrain patch according to an embodiment. Environ ent 100 shows a terrain 110 that includes a mountain rendered from terrain data acquired from a geographic information system. Terrain 110 is comprised of a mesh of primitives where each primitive is a triangle. The triangles that make up the mesh are described by the terrain data. While triangles are used in environment 100 to create the mesh for terrain 110, other polygons may also be used. Environment 100 also includes terrain patch 120 that, when applied to the terrain of environment 100, flattens some of the terrain around and including the mountain. Terrain patch 120 is rendered from a mesh of primitives derived from custom terrain data retrieved from a storage device. The custom terrain data defines a custom grid that includes terrain altitudes at each point on the custom grid.

The terrain patch 120 is applied to terrain 110 by converting the mesh of primitives in terrain 110 to a surface grid. The surface grid is derived by determining a terrain altitude at the location of the mesh that corresponds to a point of the surface grid. The custom grid is converted to a patch grid that matches the resolution of the surface grid. The patch grid is derived by interpolating the terrain altitudes included in the custom grid based on the difference between the resolution of the custom grid and the patch grid. The terrain altitudes of the surface grid and patch grid are then blended using one of any number of blending techniques. Here, the blending technique replaced the terrain altitude of the surface grid with the corresponding terrain altitude from the patch grid.

FIG. 1B illustrates an example three-dimensional environment 150 rendered with an alternative terrain patch 160 according to an embodiment. Environment 150 includes a terrain patch 160 that describes color values that, when applied to the terrain, represent geological features and layers of a volcano. The color values are included in the custom terrain data along with terrain altitudes (e.g., height values) that approximate the unmodified terrain of environment 150. Terrain patch 160 is applied to the terrain using a similar method used in environment 100 except that color data from the custom terrain data is blended with the terrain to show the geological features and layers.

Figure 2A:
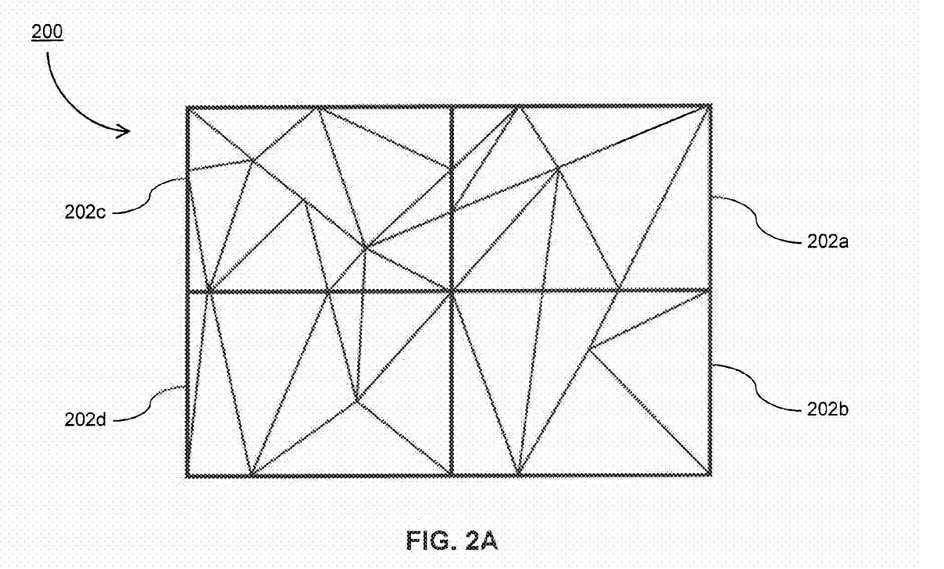
FIGS. 2A-F illustrate example diagrams showing the process for generating and rendering a terrain patch in a three-dimensional environment according to an embodiment.

FIGS. 2A-F illustrate diagrams showing the process for generating and rendering a terrain patch in a three-dimensional environment according to an embodiment. FIG. 2A illustrates a diagram 200 that includes tiles 202a-d that are a level of a quad tree structure. Each of tiles 202a-d represent a three-dimensional environment that includes a terrain rendered from terrain data received from a geographic information system. The terrain data describes primitives (e.g., triangles) that, when rendered, make up a mesh that represents the surface of the three-dimensional environment.

Figure 2B:
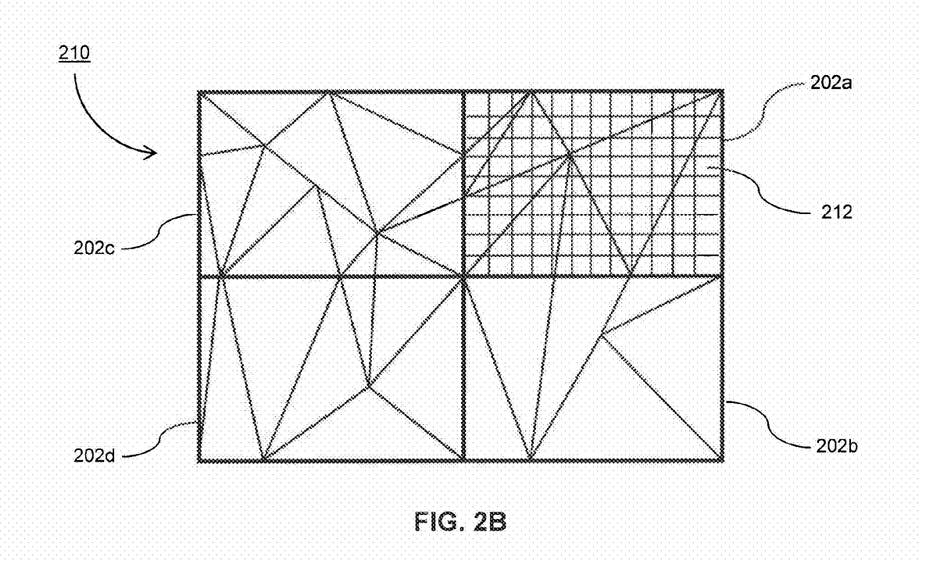

FIG. 2B illustrates a diagram 210 that includes tiles 202a-d. In diagram 210, however, the terrain mesh of tile 202a is converted to surface grid 212. Surface grid 212 includes terrain altitudes for one or more points of the terrain mesh. Surface grid 212 includes multiple rows and columns that may either be evenly spaced based on a distance or variably spaced between each row and/or column. In diagram 210, the rows and columns are represented by the horizontal and vertical lines and the points are represented where each horizontal and vertical line intersect. The distance between the rows and columns may represent a distance in the three-dimensional environment or may represent a number of pixels used to render the environment.

The terrain altitude for a point in surface grid 212 is determined from the terrain mesh by applying surface grid 212 to the terrain mesh. One or more points in surface grid 212 are then determined by calculating the altitude or height of the terrain mesh where a point from the surface grid aligns with the terrain mesh. The point may be determined by interpolating the vertices of one or more primitives closest to where the point aligns with the terrain grid.

Figure 2C:
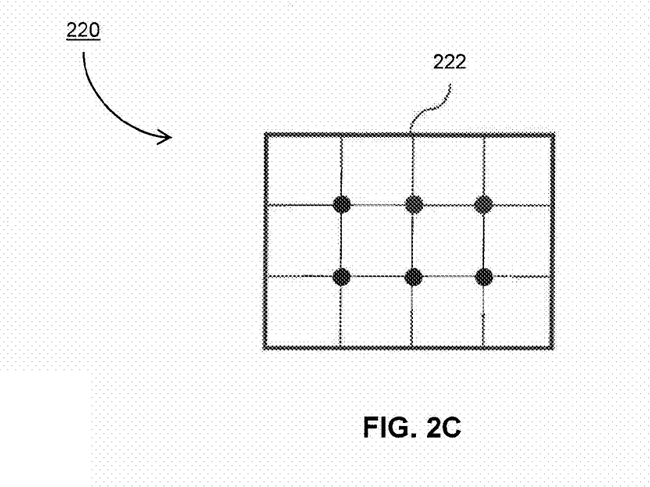

FIG. 2C illustrates diagram 220 that represents custom terrain grid 222 derived from custom terrain data. The custom terrain data may be provided by a user, another third party, or the geographic information system. Custom terrain grid 222 includes multiple rows and columns represented by the horizontal and vertical lines. Custom terrain grid 222 also includes a terrain altitude at each point in the grid. The terrain altitude may be defined by either an absolute value or a relative value. Each point in custom terrain grid 222 may also include one or more alpha values that describe how the terrain altitudes are to be blended with the terrain altitudes from the surface grid. Color values and color blending value may also be included for each point.

Figure 2D:
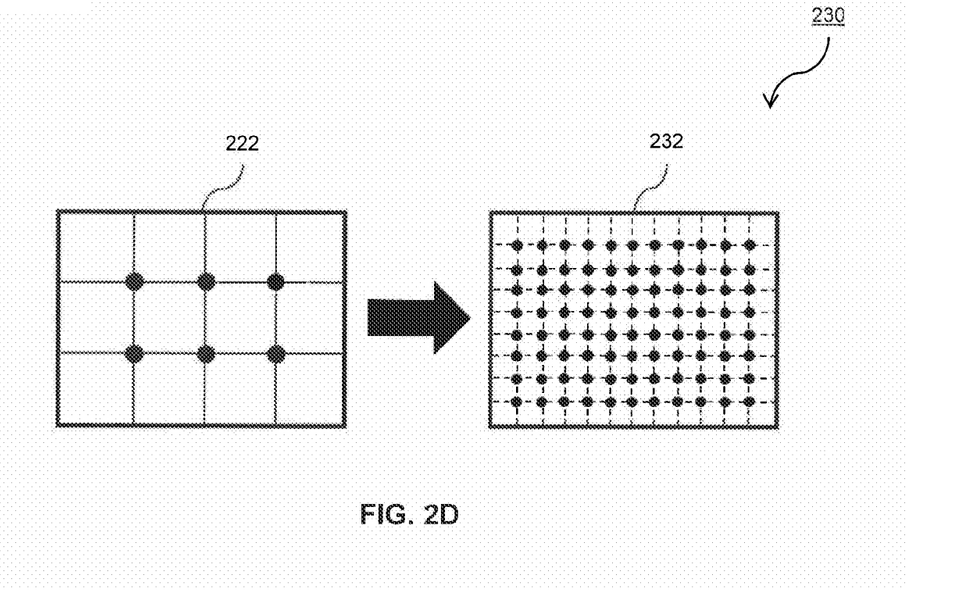

FIG. 2D illustrates diagram 230 that includes custom terrain grid 222 and patch grid 232. Patch grid 232 is generated from custom terrain grid 222. Patch grid 232 includes multiple rows and column represented by the horizontal and vertical lines. Patch grid 232 also includes points represented by where each horizontal and vertical line intersect. Patch grid 232 includes more rows, columns, and points than custom terrain grid 222 because patch grid 232 is created to match the resolution of the surface grid that the patch grid will be blended with. Here, patch grid 232 has the same resolution as surface grid 212 in FIG. 2B. The points in patch grid 232 include terrain altitudes derived from custom terrain grid 222 and may also include alpha values and color values also derived from custom terrain grid 222. The terrain altitude, alpha value, and color value derived for each point may be determined by interpolating the points in the custom terrain grid that most closely align with a point in the patch grid. In diagram 230, patch grid 232 corresponds to the same geographic area as custom terrain grid 222. In some embodiments, however, the geographic area of patch grid 232 may be larger or smaller than the geographic area of custom terrain grid 222. Additionally, patch grid 232's geographic area may correspond to the geographic area of a tile of a quad tree structure that includes the geographic area of custom terrain grid 222.

Figure 2E:
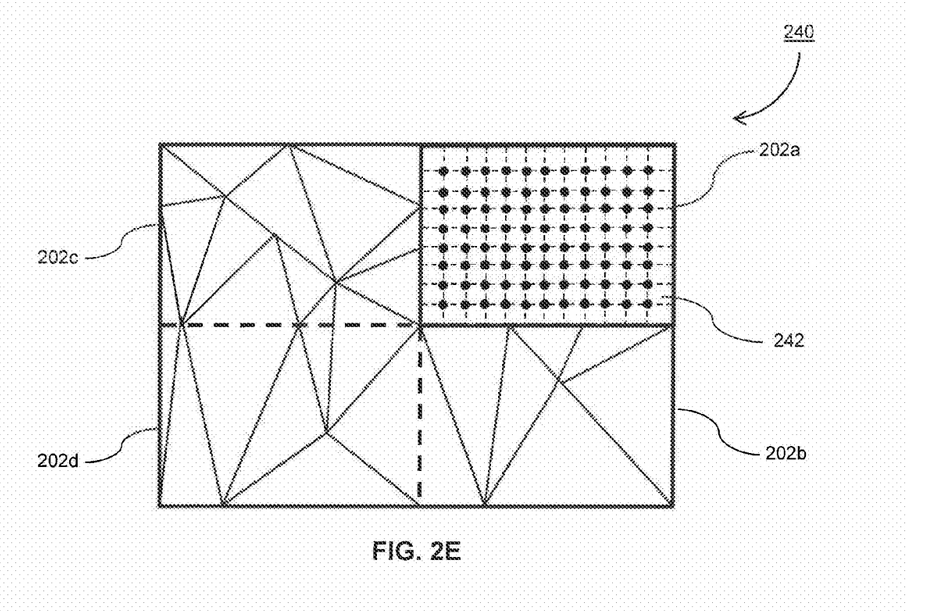

FIG. 2E illustrates diagram 240 that includes blended grid 242 that results from blending surface grid 212 with patch grid 232. Patch grid 232 may be blended with surface grid 212 by blending the terrain altitude of each two aligning points. The altitude values of the two aligning points may be blended based on the alpha value associated with the point from the patch grid. Color values from the patch grid may either be blended with or replace the color values associated with the surface grid.

Figure 2F:
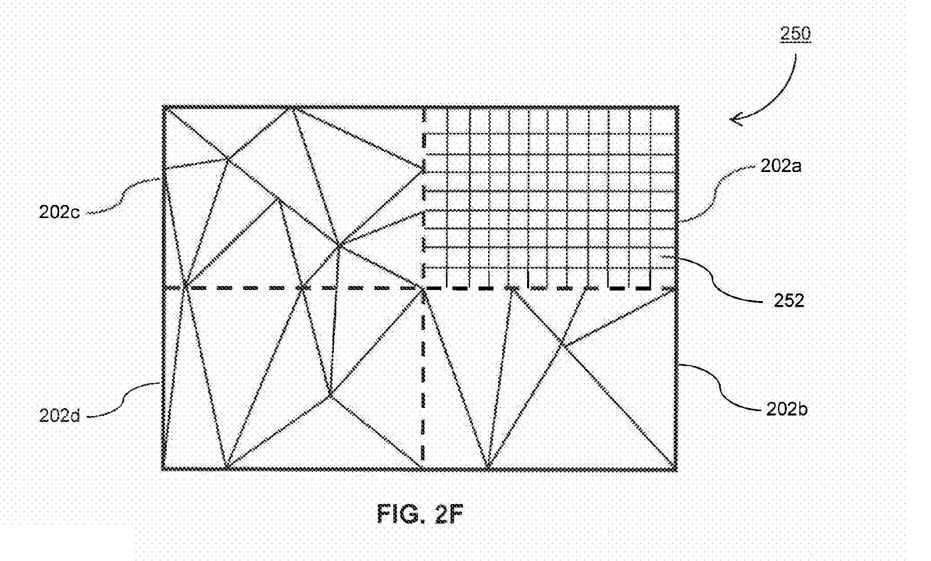

FIG. 2F illustrates diagram 250 that includes terrain mesh 252. Terrain mesh 252 is derived from terrain grid 242 by generating primitives between the location of the points in terrain grid 242. The location of a point in terrain grid 242 may thus be used as a vertex of a primitive. The altitude or height of the vertex is determined by using the terrain altitude from the corresponding point in terrain grid 242. Here, terrain mesh 252 is made up of squares but terrain mesh 252 may instead be made of other types of primitives such as, for example, triangles.

FIGS. 1A-B and 2A-F are provided as examples and are not intended to limit the embodiments described herein.

Example System Embodiments

Figure 3A:
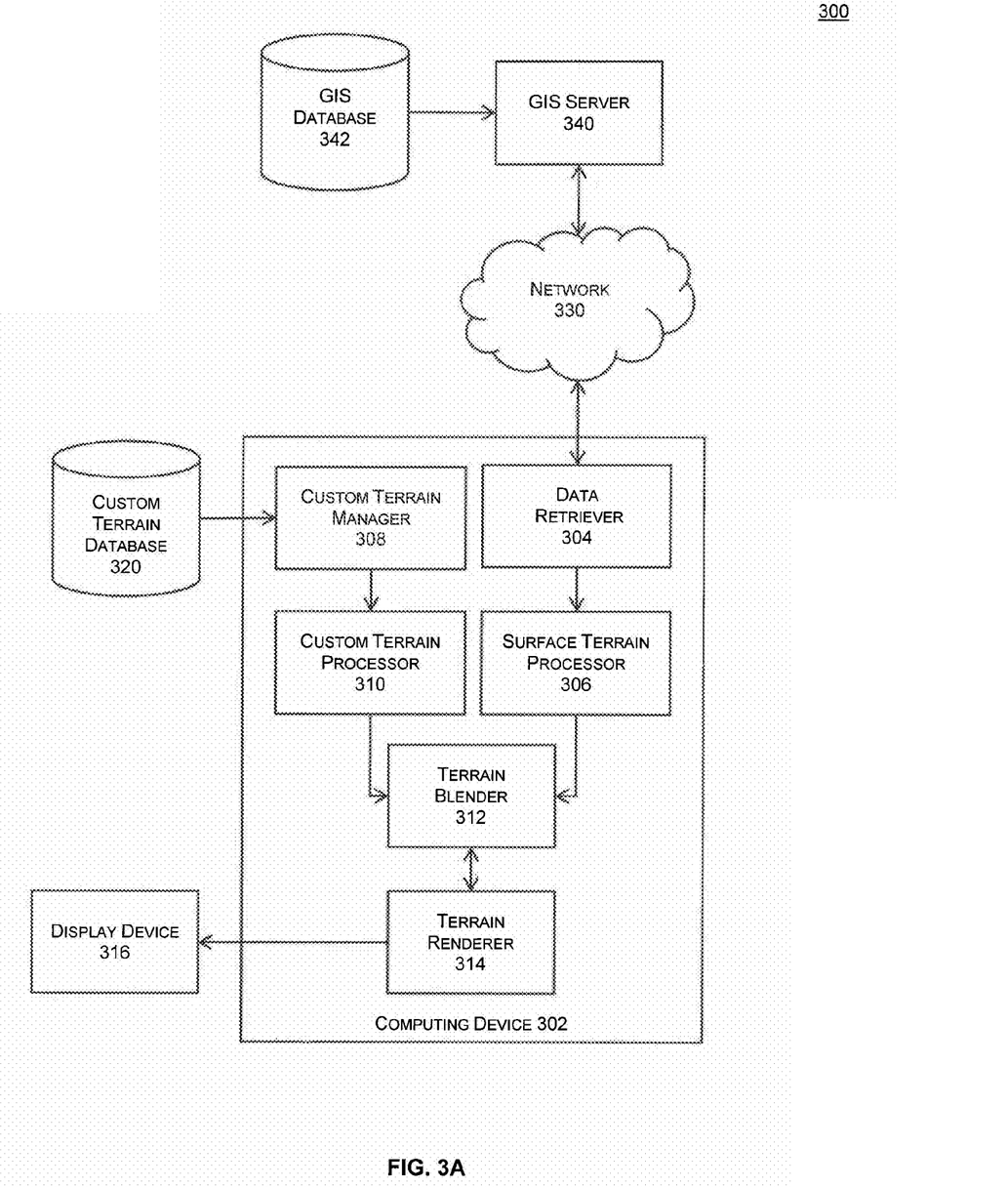
FIG. 3A illustrates an example client system for rendering a terrain patch according to an embodiment.
Figure 3B:
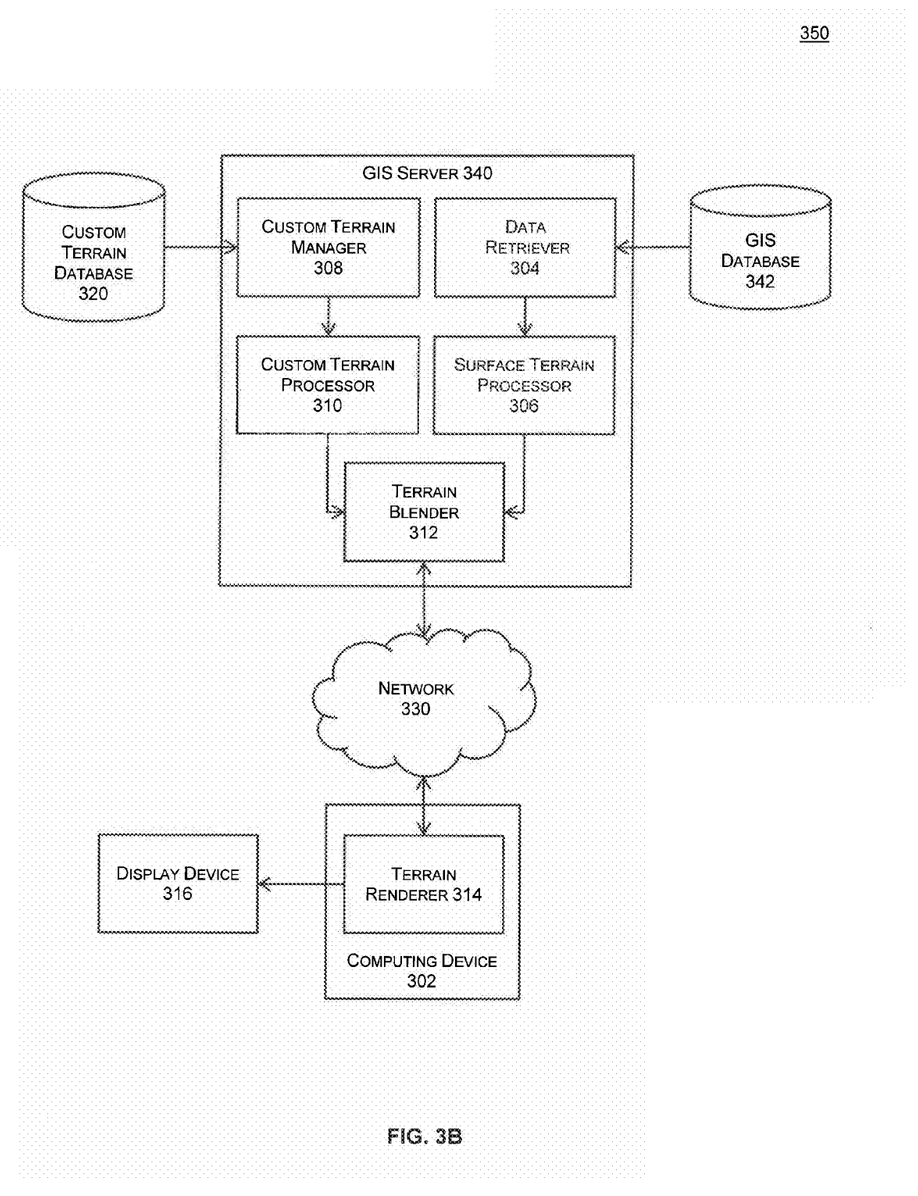
FIG. 3B illustrates an example server system for rendering a terrain patch according to an embodiment.

FIGS. 3A and 3B each illustrate example systems 300 and 350, respectively that may be used to blend custom terrain patches onto a surface of a terrain of a three-dimensional environment. System 300 describes a client embodiment while system 350 describes a server embodiment. Each of systems 300 and 350 includes a respective computing device 302, display device 316, custom terrain database 320, network 330, and GIS server 340. In system 300, client device 302 includes data retriever 304, surface terrain processor 306, custom terrain manager 308, custom terrain processor 310, terrain blender 312, and terrain renderer 314. In system 350, however, data retriever 304, surface terrain processor 306, custom terrain manager 308, custom terrain processor 310, and terrain blender 312 are each included in GIS server 340 instead of computing device 302.

Computing device 302 may be implemented on any computing device capable of rendering a three-dimensional environment. Computing device 302 may include, for example, a mobile computing device (e.g. a mobile phone, a smart phone, a personal digital assistant (PDA), a navigation device, a tablet, or other mobile computing devices). Computing device 302 may also include, but is not limited to, a central processing unit, an application-specific integrated circuit, a computer, workstation, a distributed computing system, a computer cluster, an embedded system, a stand-alone electronic device, a networked device, a rack server, a set-top box, or other type of computer system having at least one processor and memory. A computing process performed by a clustered computing environment or server farm may be carried out across multiple processors located at the same or different locations. Hardware can include, but is not limited to, a processor, memory, and a user interface display.

Terrain renderer 314, included in computing device 302, is configured to render at least a portion of a three-dimensional environment that is displayed at display device 316. Terrain renderer 314 may be implemented in software or may be implemented, at least in part, in hardware by, for example, computing device 302's video card or graphics processor. Display device 316 may be implemented using any display or monitor that can display a video signal received from computing device 302. While display device is shown in systems 300 and 350 as a separate device, some embodiments may include display device 316 in computing device 302. Such embodiments may include, for example, laptop computers, tablet devices, and smart phones.

Network 330 may include any network or combination of networks that can carry data communication. These networks may include, for example, a local area network (LAN) or a wide area network (WAN), such as the Internet. LAN and WAN networks may include any combination of wired (e.g., Ethernet) or wireless (e.g., Wi-Fi, 3G, or 4G) network components.

GIS server 340 may include any geographic information system capable of serving geo-referenced data that includes terrain data. The geo-referenced data may also include, for example, maps, satellite images, information layers, three-dimensional globes, navigable paths, and any other type of geographic data. The geo-referenced data may be served using any number of communication protocols such as, for example, Hypertext Transfer Protocol ("HTTP"), Hypertext Transfer Protocol Secure ("HTTPS"), Web Map Service ("WMS"), Web Map Tile Service ("WMTS"), Web Feature Service ("WFS"), Web Coverage Service ("WCS"), Web Processing Service ("WPS"), or Web Catalog Service ("CWS"). The geo-referenced data may be retrieved from a geographic databases such as, for example, GIS database 342. The geographic database may be implemented using a file storage application executed on GIS server 340, a stand-alone database server, or a network of database servers.

GIS server 340 and GIS database 342 may be implemented using a single computer server system or a distributed network of computer server systems. Computer server systems may include computing devices with, for example, one or more central processing units, memory units, and/or application-specific integrated circuits. Examples of computer server systems may include a computer, a workstation, a distributed computing system, a computer cluster, an embedded system, a stand-alone electronic device, a networked device, a rack server, a set-top box, or another type of computer system having at least one processor and memory.

A. Data Retriever

Data retriever 304 is configured to access terrain data. The terrain data may be included with the geo-referenced data available from, for example, GIS server 340 or GIS database 342. The terrain data describes a mesh that represents the surface of a terrain of a virtual three-dimensional environment. The mesh is constructed of primitives that are each defined by at least a location within the mesh and a terrain altitude. In some embodiments, the location of a primitive within the mesh is defined by a coordinate system such as, for example, x/y or latitude/longitude. In some embodiments, the terrain altitude for a primitive may include one value for the primitive or may include a value for each of the primitive's vertices.

Primitives that may be described by the terrain data include, for example, triangles, squares, or other polygons. For example, in embodiments where the terrain data describes triangles, each of the three vertices of a triangle may include a coordinate that describes the location of the vertex within the mesh and an altitude value that describes the height of the vertex. The terrain data may also include color data for at least a portion of a primitive. Alternatively, color data may be provided separately for one or more primitives.

B. Custom Terrain Manager

Custom terrain manager 308 is configured to access custom terrain data. The custom terrain data may be accessed from a custom terrain database such as, for example, custom terrain database 320. Custom terrain database 320 may be implemented on an internal storage device included in computing device 302, an external storage device operatively connected to computing device 302, or as a networked storage device. Networked storage devices may include, for example, a storage server device accessible via a LAN or a storage server accessible via a WAN such as, for example, the Internet. In some embodiments, the custom terrain data may be associated with a user profile that includes privacy settings that control who may access and/or edit the custom terrain data.

The custom terrain data includes at least a plurality of terrain altitudes arranged in a custom terrain grid. A boundary of the custom terrain grid defines an area of the mesh that represents the surface of the virtual three-dimensional environment. The custom terrain grid may utilize the same coordinate system as the terrain data or may utilize a different coordinate system. If the coordinate systems utilized by the terrain data and the custom terrain data differ, custom terrain manager 308, for example, may translate the custom terrain grid's coordinate system to a system compatible with the terrain data's coordinate system.

In some embodiments, the custom terrain grid may be defined by rows and columns where each row and column correspond to, respectively, a specific x/y or latitude/longitude coordinate. In some embodiments, each row and column may correspond to an essentially equivalent distance interval. In some embodiments, each row may correspond to an essentially equivalent distance interval while each column corresponds to a different essentially equivalent distance interval. In some embodiments, each row or column may correspond to a specific distance interval that may differ from an adjacent row's or column's distance interval. The distance intervals for the rows and columns may be included with the custom terrain data or may be associated with the custom terrain data as metadata.

In some embodiments, the custom terrain data also includes one or more alpha values for at least a portion of the terrain altitudes. The alpha values may be used to determine how much weight to give to an associated terrain altitude when blending the terrain altitudes, as will be described below. In some embodiments, the custom terrain data also includes color data and/or color blending data that describes one or more colors or coloring methods that may be applied to the custom terrain grid.

C. Surface Terrain Processor

Surface terrain processor 306 is configured to determine a surface grid from the primitives in the mesh that overlap the area defined by the custom terrain grid. The overlap between the custom terrain grid and the surface grid may be established, at least in part, based on user input. For example, computing device 302 may include a user interface that allows the user to load a custom terrain grid that can be selected and moved around the three-dimensional environment. As the user moves the custom terrain grid, the terrain of the three-dimensional environment may be patched and updated accordingly.

The resolution of the surface grid may be the same as the resolution used to render the terrain data, may match the resolution of the custom terrain grid, or may be a different resolution. In some embodiments, the area of the mesh that overlaps the area defined by the custom terrain grid may include one or more tiles at multiple depths of a quad tree structure, a portion of a single tile, or one or more portions of multiple tiles at the same level. If the overlapping area includes multiple tiles, a surface grid for each tile or a portion of each tile may be determined.

The surface grid is determined such that some of the points in the surface grid include a terrain altitude according to where the point in the surface grid falls on the mesh. Similar to the custom terrain grid, the surface grid includes rows and columns where the distance between each row and column may be essentially equivalent or specific for each row and/or column. In some embodiments, the distance between each row and/or column are based on the resolution of the terrain data such that each pixel rendered from the terrain data corresponds to a unique row and column (e.g., point).

Any number of methods may be used to determine the surface grid from the mesh. In embodiments where the terrain data and the surface grid utilize the same resolution, the terrain altitude of each vertex on the mesh may be copied to its corresponding point in the surface grid. If a point of the surface grid does not correspond to a vertex, however, a value may be inserted to indicate that no vertex was available. Alternatively, instead of inserting a "no vertex" value, a terrain altitude may be calculated by interpolating the terrain altitudes from the closest vertices in the mesh. Interpolation methods may also be used in embodiments where the surface grid utilizes a different resolution than the terrain data. For example, the terrain altitude for a point in the surface grid may be calculated by interpolating terrain altitudes of vertices from the primitives in the mesh that are closest to the point in the surface grid.

Once the surface grid is determined, a mesh of primitives derived from the surface grid may replace the corresponding area of the mesh derived from the terrain data. If the area defined by the surface grid corresponds to an entire tile of a quad tree structure, the terrain of the surface grid may replace the terrain of the tile. In some embodiments, if the area of the surface grid does not correspond to a single tile, the surface grid may be expanded to include the terrain of the entire tile. In some embodiments, a surface grid may be integrated into a tile or into neighboring tiles by forming new primitives around the edges of the surface grid that blend the mesh defined by the terrain data with the mesh defined by the surface grid.

D. Custom Terrain Processor

Custom terrain processor 310 is configured to determine a patch grid from the custom terrain grid such that each point in the patch grid includes a terrain altitude derived from the custom terrain grid. The area of the patch grid corresponds to the same area as the custom terrain grid but the patch grid may utilize a different resolution such as, for example, the resolution utilized by the surface grid. In cases where the surface grid and the patch grid utilize the same resolution, each point in the patch grid will align with a point in the surface grid.

Each point in the patch grid may be derived by interpolating terrain altitudes from points in the custom terrain grid. In some embodiments, custom terrain processor 310 is configured to interpolate the terrain altitudes from a group of points in the custom terrain grid that are closest to the location of the point in the surface grid. For example, if the custom terrain grid utilizes a lower resolution than the surface grid, the patch grid may be created such that it has same resolution as the surface grid. The patch grid may include the same number of rows and columns as the surface grid and each row and column may specify a coordinate that indicates the location of the point at each row and column. For each point in the patch grid, a group of points from the custom terrain grid that are closest to the location of a point in the patch grid may be identified. The terrain altitude of the point in the patch grid may then be derived by interpolating the identified group of points from the custom terrain grid based on the location and the terrain altitude of each point in the identified group.

A similar method may be used when the patch grid is at a lower resolution than the custom terrain grid. Alternatively, if the location of a point in the custom terrain grid matches the location of a point in the patch grid, the terrain altitude at the point in the custom terrain grid may be inserted into the matching point in the patch grid. If the resolution of the custom terrain grid matches the resolution of the surface grid, the step of creating a patch grid may be optional and instead, the terrain altitude at each point in the custom terrain grid may be inserted into the point in the surface grid with the same location.

In some embodiments, each point of the patch grid may also include an alpha value that is derived from the custom terrain grid. The alpha value may be determined from alpha values of points in the custom terrain grid using a similar interpolation method used to determine a terrain altitude. The alpha value may be used to determine the amount of weight to apply to an associated terrain altitude when blending the terrain altitude with a terrain altitude from a point of the surface grid. In some embodiments, an alpha value may be included only for points along the edge of the patch grid so the edge of the patch grid may be smoothly blended with the existing terrain.

In some embodiments, each point of the patch grid may also include a color value that is derived from the custom terrain grid. The color value may be determined from color values of points in the custom terrain grid using a similar interpolation method used to determine the terrain altitude. The color value may be used to establish an endpoint of a color range that may be used to blend color between vertices of a polygon.

E. Terrain Blender

Terrain blender 312 is configured to blend the patch grid and the surface grid such that each terrain altitude in the patch grid modifies its aligned terrain altitude in the surface grid. In embodiments where the resolution of the custom terrain grid matches the resolution of the surface grid, terrain blender 312 may be configured to modify terrain altitudes in the surface grid with corresponding terrain altitudes from the custom terrain grid. In this way, terrain blender 312 obtains a blended surface grid that combines, at least in part, the terrain altitudes from the surface and patch grids. In some embodiments, the extent to which a terrain altitude from the patch grid modifies its corresponding terrain altitude in the surface grid is based on an alpha value associated with the terrain altitude from the patch grid. For example, if a point of the patch grid has an alpha value representing 50 percent, the associated terrain altitude may be blended with the corresponding terrain altitude from the surface grid such that the blended terrain value is half way between the terrain altitudes from the surface grid and the terrain altitude from the patch grid.

Terrain blender 312 may also blend color values associated with corresponding points from the surface and patch grids. In some embodiments, a color value from the patch grid may replace the corresponding color value from the surface grid. In some embodiments, a color value from the patch grid may be blended with a color value from the surface grid using the alpha value associated with the point that includes the color value. In some embodiments the color value may be associated with an alpha value distinct from the alpha value used to blend terrain altitudes.

Various aspects of embodiments described herein can be implemented by software, firmware, hardware, or a combination thereof. The embodiments, or portions thereof, can also be implemented as computer-readable code. The embodiment in systems 300 and 350 are not intended to be limiting in any way.

Example Method Embodiments

Figure 4:
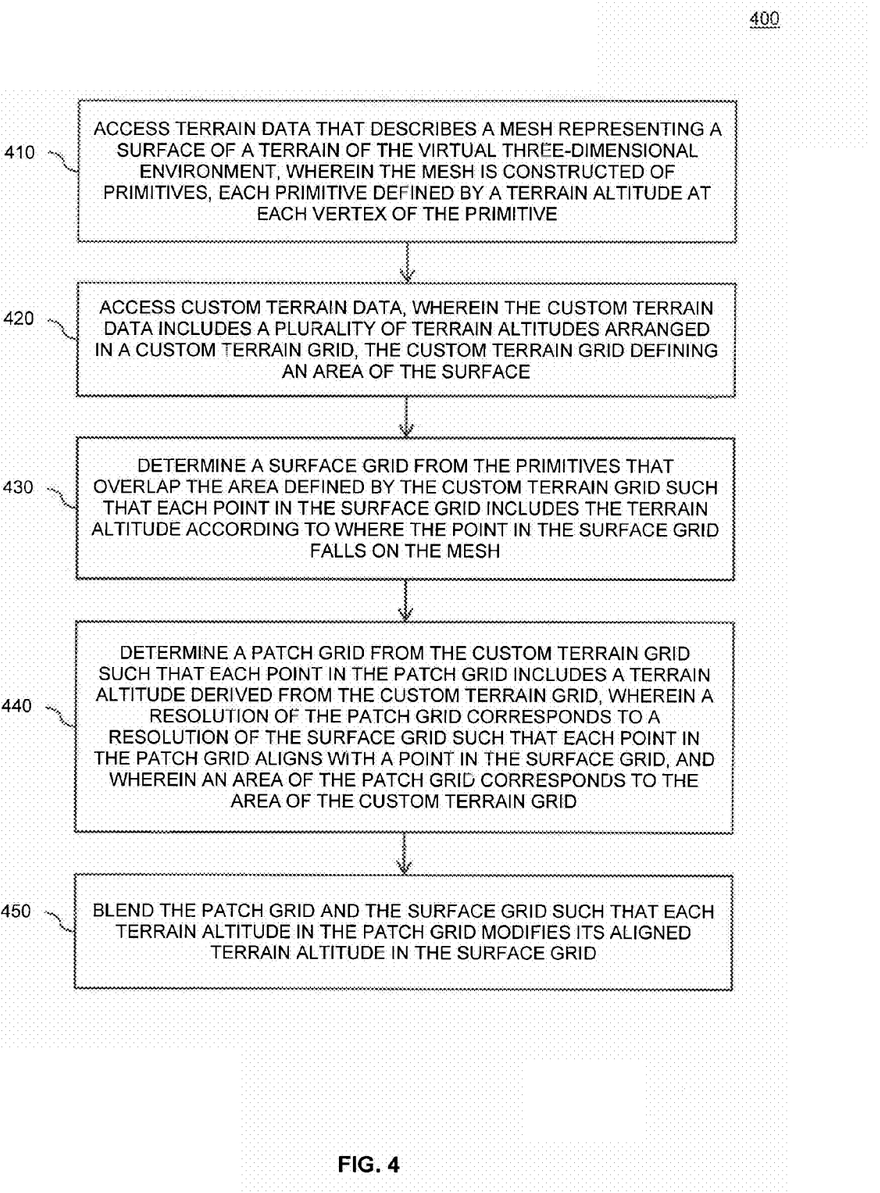
FIG. 4 is a flowchart illustrating an example method that may be used to render a terrain patch according to an embodiment.

FIG. 4 is a flowchart illustrating a method 400 that may be used to blend custom terrain patches onto a surface of a terrain of a virtual three-dimensional environment according to an embodiment. While method 400 is described with respect to an embodiment, method 400 is not meant to be limiting and may be used it other applications. Additionally, method 400 may be carried out by, for example, system 300 in FIG. 3A or system 350 in FIG. 3B.

Method 400 accesses terrain data that describes a mesh representing the surface of the terrain of the virtual three-dimensional environment (stage 410). The mesh is constructed of primitives and each primitive is defined by a terrain altitude at each of the primitive's vertices. Primitives that make up the mesh may include triangles, squares, or other polygons. Stage 410 may be carried out by, for example, data retriever 304 embodied in systems 300 and 350.

Method 400 also accesses custom terrain data (stage 420). The custom terrain data includes a plurality of terrain altitudes arranged in a custom terrain grid. The custom terrain data may also include alpha values color values or other data that defines the custom terrain. The custom terrain grid defines an area of the surface of the three-dimensional environment. The area may be defined by a coordinate range of the three-dimensional environment. Stage 420 may be carried out by, for example, custom terrain manager 308 embodied in systems 300 and 350.

Method 400 also determines a surface grid from the primitives that overlap the area defined by the custom terrain grid such that each point in the surface grid includes the terrain altitude according to where the point in the surface grid falls on the mesh (stage 430). The terrain altitude for the point in the surface grid may be determined by interpolating the altitude or height of the vertices closest to the location where the point aligns with the mesh. Stage 430 may be carried out by, for example, surface terrain processor 306 embodied in systems 300 and 350.

Method 400 also determines a patch grid from the custom terrain grid such that each point in the patch grid includes a terrain altitude derived from the custom terrain grid (stage 440). The area of the patch grid corresponds to the area of the custom terrain grid and the resolution of the patch grid corresponds to the resolution of the surface grid such that each point in the patch grid aligns with a point in the surface grid. The patch grid may also include alpha values or other data for each point that is derived from the custom terrain grid. The data for each point in the patch grid may be determined by interpolating the points in the custom terrain grid that most closely align with the point in the patch grid. Stage 440 may be carried out by, for example, custom terrain processor 310 embodied in systems 300 and 350.

Finally, method 400 blends the patch grid and the surface grid such that each terrain altitude from the patch grid modifies its aligned terrain altitude from the surface grid (stage 450). The terrain altitude from the patch grid may be blended with the terrain altitude from the surface grid based, at least in part, on an alpha value associated with the terrain altitude from the patch grid. Stage 450 may be carried out by, for example, terrain blender 312 embodied in systems 300 and 350.

Example Computer System

Figure 5:
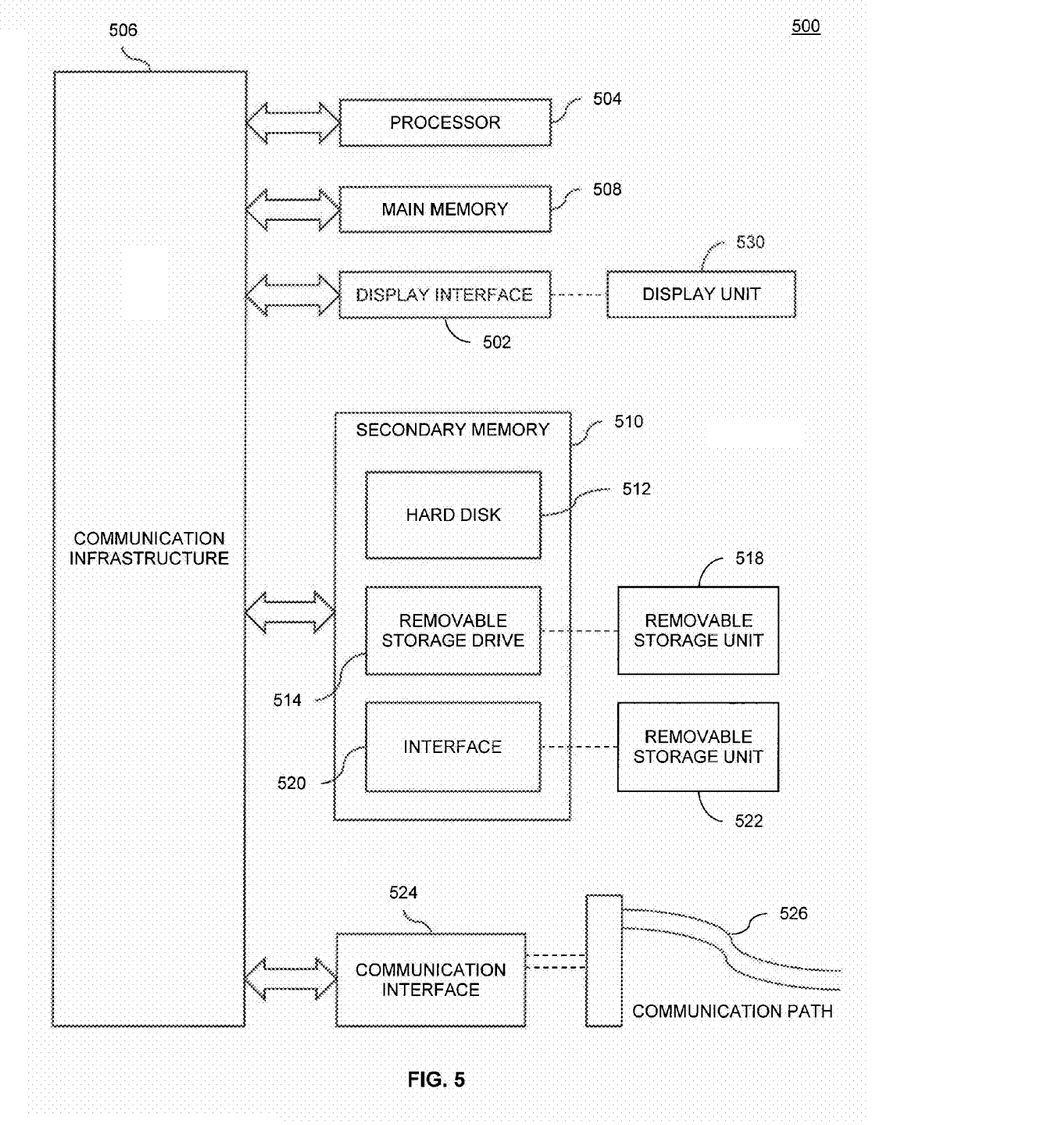
FIG. 5 illustrates an example computer in which the embodiments described herein, or portions thereof, may be implemented as computer-readable code.

FIG. 5 illustrates an example computer 500 which the embodiments described herein, or portions thereof, may be implemented as computer-readable code. For example, data retriever 304, surface terrain processor 306, custom terrain manager 308, custom terrain processor 310, terrain blender 312, or terrain renderer 314 may each be implemented in one or more computer systems 500 using hardware, software, firmware, computer readable storage media having instructions stored thereon, or a combination thereof.

One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above described embodiments. A processor device may be a single processor, a plurality of processors, or combinations thereof. Processor devices may have one or more processor "cores."

Various embodiments are described in terms of this example computer system 500. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 504 may be a single processor in a multi-core/multiprocessor system, such system operating alone, or in a cluster of computing devices operating in a cluster or server farm. Processor device 504 is connected to a communication infrastructure 506, for example, a bus, message queue, network, or multi-core message-passing scheme. Computer system 500 may also include display interface 502 and display unit 530.

Computer system 500 also includes a main memory 508, for example, random access memory (RAM), and may also include a secondary memory 510. Secondary memory 510 may include, for example, a hard disk drive 512, and removable storage drive 514. Removable storage drive 514 may include a floppy disk drive, a magnetic tape drive, an optical disk drive, a flash memory drive, or the like. The removable storage drive 514 reads from and/or writes to a removable storage unit 518 in a well-known manner. Removable storage unit 518 may include a floppy disk, magnetic tape, optical disk, flash memory drive, etc. which is read by and written to by removable storage drive 514. As will be appreciated by persons skilled in the relevant art, removable storage unit 518 includes a computer readable storage medium having stored thereon computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 may be in the form of signals, which may be electronic, electromagnetic, optical, or other signals capable of being received by communications interface 524. These signals may be provided to communications interface 524 via a communications path 526. Communications path 526 carries signals and may be implemented using wire or cable, fiber optics, a phone line, a cellular phone link, an RF link or other communications channels.

In this document, the terms "computer storage medium" and "computer readable storage medium" are used to generally refer to media such as removable storage unit 518, removable storage unit 522, and a hard disk installed in hard disk drive 512. Computer storage medium and computer readable storage medium may also refer to memories, such as main memory 508 and secondary memory 510, which may be memory semiconductors (e.g. DRAMs, etc.).

Computer programs (also called computer control logic) are stored in main memory 508 and/or secondary memory 510. Computer programs may also be received via communications interface 524. Such computer programs, when executed, enable computer system 500 to implement the embodiments described herein. In particular, the computer programs, when executed, enable processor device 504 to implement the processes of the embodiments, such as, for example, the stages in the method illustrated by flowchart 400 of FIG. 4, described above. Accordingly, such computer programs represent controllers of computer system 500. Where an embodiment is implemented using software, the software may be stored in a computer storage medium and loaded into computer system 500 using removable storage drive 514, interface 520, and hard disk drive 512, or communications interface 524.

Embodiments of the invention also may be directed to computer program products including software stored on any computer readable storage medium. Such software, when executed in one or more data processing device, causes a data processing device(s) to operate as described herein. Examples of computer readable storage mediums include, but are not limited to, primary storage devices (e.g., any type of random access memory) and secondary storage devices (e.g., hard drives, floppy disks, CD ROMS, ZIP disks, tapes, magnetic storage devices, and optical storage devices, MEMS, nanotechnological storage device, etc.).

Conclusion

The Summary and Abstract sections may set forth one or more but not all exemplary embodiments as contemplated by the inventor(s), and thus, are not intended to limit the present invention and the appended claims in any way.

The foregoing description of specific embodiments so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

What is claimed is:

1. A computer-implemented method for blending custom terrain patches onto a surface of a terrain of a virtual three-dimensional environment comprising:

accessing, by at least one computer processor, terrain data that describes a mesh representing the surface of the terrain of the virtual three-dimensional environment, wherein the mesh is constructed of primitives, each primitive defined by a terrain altitude at each vertex of the primitive;

accessing, by at least one computer processor, custom terrain data, wherein the custom terrain data includes a plurality of terrain altitudes arranged in a custom terrain grid, a boundary of the custom terrain grid defining an area of the surface;

determining, by at least one computer processor, a surface grid from the primitives that overlap the area defined by the custom terrain grid such that each point in the surface grid includes the terrain altitude according to where the point in the surface grid falls on the mesh;

determining, by at least one computer processor, a patch grid from the custom terrain grid such that each point in the patch grid includes a terrain altitude derived from the custom terrain grid, wherein a resolution of the patch grid corresponds to a resolution of the surface grid such that each point in the patch grid aligns with a point in the surface grid, and wherein an area of the patch grid includes at least a portion of the area of the custom terrain grid; and blending, by at least one computer processor, the patch grid and the surface grid to obtain a blended surface grid, wherein the blended surface grid includes at least one terrain altitude from the surface grid modified by a corresponding terrain altitude from the patch grid.

2. The computer-implemented method of claim 1, wherein at least some points in the patch grid include an alpha value, and wherein blending the patch grid and the surface grid includes using an alpha value to determine the extent to which a terrain altitude from the patch grid modifies its corresponding terrain altitude in the surface grid.

3. The computer-implemented method of claim 2, wherein the alpha value is associated with a point that falls along a boundary of the patch grid.

4. The computer-implemented method of claim 1, wherein determining the patch grid includes interpolating the terrain altitudes from a closest group of points in the custom terrain grid to derive a terrain altitude for a point in the patch grid, the closest group of points determined based on a difference between the resolutions of the patch and custom terrain grids.

5. The computer-implemented method of claim 4, wherein each point in the custom terrain data includes an alpha value, and wherein determining the patch grid includes interpolating the alpha values from the closest group of points to derive the alpha value for a point in the patch grid.

6. The computer-implemented method of claim 1, wherein the overlap between the surface and the custom terrain grid is determined, at least in part, from user input.

7. The computer-implemented method of claim 1, wherein the area of the custom terrain grid corresponds to a tile of a layer of a quad tree structure.

8. The computer-implemented method of claim 1, wherein the area of the custom terrain grid corresponds to multiple tiles of a quad tree structure, and wherein determining a surface grid includes determining a surface grid for each tile.

9. The computer-implemented method of claim 1, wherein the area of the custom terrain grid corresponds to a portion of a tile of a quad tree structure, and determining a surface grid includes determining a surface grid for the tile.

10. The computer-implemented method of claim 1, wherein the patch grid includes color data derived from the custom terrain data, and wherein blending the patch grid and the surface grid includes blending a color data for at least one point in the surface grid with the color data of the aligned point of the surface grid.

11. A computer system for blending custom terrain patches onto a surface of a terrain of a virtual three-dimensional environment comprising:

a data retriever configured to access terrain data that describes a mesh representing the surface of the terrain of the virtual three-dimensional environment, wherein the mesh is constructed of primitives, each primitive defined by a terrain altitude at each vertex of the primitive;

a custom terrain manager configured to access custom terrain data, wherein the custom terrain data includes a plurality of terrain altitudes arranged in a custom terrain grid, the custom terrain grid defining an area of the surface;

a custom terrain processor configured to determine a patch grid from the custom terrain grid such that each point in the patch grid includes a terrain altitude derived from the custom terrain grid, wherein a resolution of the patch grid corresponds to a resolution of the surface grid such that each point in the patch grid aligns with a point in the surface grid, and wherein an area of the patch grid includes at least a portion of the area of the custom terrain grid;

a surface terrain processor configured to determine a surface grid from the primitives that overlap the area defined by the custom terrain grid such that each point in the surface grid includes the terrain altitude according to where the point in the surface grid falls on the mesh; and a terrain blender configured to blend the patch grid and the surface grid to obtain a blended surface grid, wherein the blended surface grid includes at least one terrain altitude from the surface grid modified by a corresponding terrain altitude from the patch grid;

at least one memory unit configured to store at least one of the data retriever, the custom terrain manager, the custom terrain processor, the surface terrain processor, or the terrain blender; and at least one computer processor configured to execute at least one of the data retriever, the custom terrain manager, the custom terrain processor, the surface terrain processor, or the terrain blender.

12. The computer system of claim 11, wherein at least some points in the patch grid include an alpha value, and wherein the terrain blender is further configured to use an alpha value to determine the extent to which a terrain altitude from the patch grid modifies its corresponding terrain altitude in the surface grid.

13. The computer system of claim 12, wherein the alpha value is associated with a point that falls along a boundary of the patch grid.

14. The computer system of claim 11, wherein the custom terrain processor is further configured to interpolate the terrain altitudes from a closest group of points in the custom terrain grid to derive a terrain altitude for a point in the patch grid, the closest group of points determined based on a difference between the resolutions of the patch and custom terrain grids.

15. The computer system of claim 14, wherein each point in the custom terrain data includes an alpha value, and wherein the custom terrain processor is further configured to interpolate the alpha values from the closest group of points to derive the alpha value for a point in the patch grid.

16. The computer system of claim 11, wherein the overlap between the surface and the custom terrain grid is determined, at least in part, from user input.

17. The computer system of claim 11, wherein the area of the custom terrain grid corresponds to a tile of a layer of a quad tree structure.

18. The computer system of claim 11, wherein the area of the custom terrain grid corresponds to multiple tiles of a quad tree structure, and wherein the surface terrain processor is further configured to determine a surface grid for each tile.

19. The computer system of claim 11, wherein the area of the custom terrain grid corresponds to a portion of a tile of a quad tree structure, and the surface terrain processor is further configured to determine a surface grid for the tile.

20. The computer system of claim 11, wherein the patch grid includes color data derived from the custom terrain data, and wherein the terrain blender is further configured to blend a color data for at least one point in the surface grid with the color data of the aligned point of the surface grid.

21. A non-transitory computer-readable storage medium having instructions encoded thereon that, when executed by a computing device, causes the computing device to perform operations comprising:
- accessing terrain data that describes a mesh representing the surface of the terrain of the virtual three-dimensional environment, wherein the mesh is constructed of primitives, each primitive defined by a terrain altitude at each vertex of the primitive;
- accessing custom terrain data, wherein the custom terrain data includes a plurality of terrain altitudes arranged in a custom terrain grid, the custom terrain grid defining an area of the surface;
- determining a surface grid from the primitives that overlap the area defined by the custom terrain grid such that each point in the surface grid includes the terrain altitude according to where the point in the surface grid falls on the mesh;
- determining a patch grid from the custom terrain grid such that each point in the patch grid includes a terrain altitude derived from the custom terrain grid, wherein a resolution of the patch grid corresponds to a resolution of the surface grid such that each point in the patch grid aligns with a point in the surface grid, and wherein an area of the patch grid corresponds to an area of a tile of a quad tree structure; and
- blending the patch grid and the surface grid to obtain a blended surface grid, wherein the blended surface grid includes at least one terrain altitude from the surface grid modified by a corresponding terrain altitude from the patch grid.

* * * * *